United States Patent [19]
Girotti

[11] Patent Number: 6,135,352
[45] Date of Patent: Oct. 24, 2000

[54] SCANNING READER OF AN OPTICAL CODE PLACED ON AN ARTICLE IN MOVEMENT AND A METHOD OF SCANNING SAID OPTICAL CODE BY MEANS OF SAID READER

[75] Inventor: Lorenzo Girotti, Bologna, Italy

[73] Assignee: Datalogic S.p.A., Bologna, Italy

[21] Appl. No.: 08/988,426

[22] Filed: Dec. 10, 1997

[30] Foreign Application Priority Data

Dec. 11, 1996 [IT] Italy .................. MI96A2595

[51] Int. Cl.[7] .................. G06K 7/10; G06K 7/14
[52] U.S. Cl. .................. 235/454; 235/462.22; 235/470; 250/235; 359/216
[58] Field of Search .................. 235/454, 462.08, 235/462.14, 462.22, 462.31, 462.32, 462.33, 462.34, 462.35, 462.36, 462.38, 462.39, 462.4, 470; 250/234, 235, 236; 359/216, 218, 219

[56] References Cited

U.S. PATENT DOCUMENTS

| | | | |
|---|---|---|---|
| 3,701,098 | 10/1972 | Acker | 235/454 X |
| 3,728,677 | 4/1973 | Munson | 235/462.39 X |
| 3,899,687 | 8/1975 | Jones | 235/454 X |
| 4,753,498 | 6/1988 | Saitoh et al. | 359/216 X |
| 4,843,222 | 6/1989 | Hochgraf | 235/470 |
| 4,939,355 | 7/1990 | Rando et al. | 235/462.14 |
| 5,000,529 | 3/1991 | Katoh et al. | 359/216 |
| 5,175,421 | 12/1992 | Harris | 235/462.22 |
| 5,200,597 | 4/1993 | Eastman et al. | 235/462.33 X |
| 5,311,999 | 5/1994 | Malow et al. | 235/470 X |
| 5,392,150 | 2/1995 | Inagaki | 359/221 |
| 5,481,096 | 1/1996 | Hippenmeyer et al. | 235/454 |
| 5,525,788 | 6/1996 | Bridgelall et al. | 235/462.36 |
| 5,525,791 | 6/1996 | Krichever et al. | 235/462.36 X |
| 5,679,941 | 10/1997 | Iizaka et al. | 235/462.14 X |
| 5,693,930 | 12/1997 | Katoh et al. | 235/462.35 |

FOREIGN PATENT DOCUMENTS

| | | |
|---|---|---|
| 0 341 717 | 11/1989 | European Pat. Off. |
| 0 396 485 | 11/1990 | European Pat. Off. |
| 0 444 958 A1 | 9/1991 | European Pat. Off. |
| 0 652 530 A2 | 5/1995 | European Pat. Off. |

Primary Examiner—Donald Hajec
Assistant Examiner—Jared J. Fureman
Attorney, Agent, or Firm—Nixon & Vanderhye P.C.

[57] ABSTRACT

A scanning reader of an optical code placed on a front wall of an article in movement comprises generators that form at least one first and one second light beam lying on planes inclined by a first and by a second prefixed angle ($\alpha$, $\beta$) with respect to the front wall so as to explore a first and a second area of the front wall by at least one first and one second scanning line and read the optical code within an overall distance range, along the direction of forward movement of the article, greater than the useful range of reading distance that can be reached by one light beam only.

29 Claims, 4 Drawing Sheets

SCANNING READER OF AN OPTICAL CODE PLACED ON AN ARTICLE IN MOVEMENT AND A METHOD OF SCANNING SAID OPTICAL CODE BY MEANS OF SAID READER

BACKGROUND OF THE INVENTION

1. Field of the Invention

This application is based on application No. MI96 A 002595 filed in Italy, the content of which is incorporated hereinto by reference.

The present invention relates to a scanning reader of an optical code placed on an article in movement and a method of scanning said optical code by means of said reader.

2. Discussion of Prior Art

The term "optical code" is intended to mean a set of graphic markings (placed on a label or directly on a product or on any other support) by means of which a piece of information is coded as a sequence of white areas and black areas or of variously coloured areas, arranged according to one or more directions. Examples of such codes are the bar codes, the two-dimensional codes, the colour codes and the like.

Generally, a scanning reader of an optical code placed on an article in movement comprises a source of light capable of generating a beam of coherent light and suitable optical components capable of focusing the light beam on the code, forming a scanning line. The light diffused by the optical code, consisting of a series of impulses, is directed to a photodetector that emits electrical signals representative of the detected light. The electrical signals are decoded in an electrical or electronic circuit that provides data capable of describing the optical code.

If the optical code is of the bar type, as is commonly the case, in order to read it correctly, the light beam is focused on the code so that the projection of its cross-section on the code has precise dimensions, determined by the thickness of the bars of the code. In fact, the reading of the code would be incorrect if the cross-section of the light beam were to cover more than two bars.

In a number of cases the article is transported by a conveyor belt and the reader is located along the path of the article so as to be able to read the optical code that is applied in a random position on one of its walls. If the optical code is on a side wall, substantially parallel to the direction of movement of the article, the optical code reader is placed in front of such wall. The beam of scanning light has a direction that is substantially orthogonal to the wall on which there is the optical code and, whatever the position of the optical code with respect to the wall, on the top, on the bottom, in the centre or on the sides, the reading does not exhibit any problems. On the other hand, if the optical code is placed on a front or rear wall of the article, substantially orthogonal to the direction of movement, the reader is placed above the conveyor belt and, thus, above the front or rear wall on which there is the code and the article, with its movement, gets closer to it or moves away from it. The beam of scanning light has a direction oblique with respect to the optical code and it is difficult to make a sufficient number of useful scans while the article is in the range of depth of the light beam that, generally, is fairly narrow.

SUMMARY OF THE INVENTION

It is a first object of the invention to provide a scanning reader of an optical code placed on a front wall of an article in movement toward said reader and having a random position on said front wall, said reader comprising generation means capable of forming at least one light beam lying on a plane inclined by a prefixed angle with respect to said front wall and capable of reading said optical code within a prefixed distance range along the direction of movement of said article, characterized in that said generation means form at least one first and one second light beam lying in planes inclined by a first and by a second prefixed angle with respect to said front wall, said first light beam exploring a first area of said front wall by means of at least one first scanning line and said second light beam exploring a second area of said front wall by means of at least one second scanning line so that said first light beam is capable of reading said optical code within a first prefixed distance range along the direction of movement of said article and said second light beam is capable of reading said optical code within a second prefixed distance range along the direction of movement of said article, the overall distance range within which said first and second light beams are capable of reading said optical code being greater than the useful range of reading distance that can be reached by one light beam only.

When particular requirements so demand, said generation means form more than two beams of light, for example three or four beams.

Generally, the number of scans per second executed by said beams of light are not the same.

Preferably, the number of scans per second executed by said beams of light is such that the number of useful scans on said code is substantially constant.

Advantageously, the ratio between the number of scans per unit of time of each light beam is inversely proportional to the angle of the plane containing the same beam with respect to the front wall.

Generally, said generation means comprise at least one source of a light beam and deflection means of said beam.

Preferably, the deflection means comprise a polygonal rotor having mirror faces.

It is a second object of the invention to provide a polygonal rotor for a scanning reader of an optical code characterized in that it comprises at least one prefixed number of mirrors inclined by a first prefixed angle $\delta_1$ with respect to the axis of rotation of said rotor and a second prefixed number of mirrors inclined by a second prefixed angle $\delta_2$ with respect to the axis of rotation of said rotor.

When particular requirements so demand, said polygonal rotor comprises a first prefixed number of mirrors inclined by a first prefixed angle with respect to the axis of rotation of said rotor, a second prefixed number of mirrors inclined by a second prefixed angle with respect to the axis of rotation of said rotor and a third prefixed number of mirrors inclined by a third prefixed angle with respect to the axis of rotation of said rotor.

When required, said polygonal rotor comprises a first prefixed number of mirrors inclined by a first prefixed angle with respect to the axis of rotation of said rotor, a second prefixed number of mirrors inclined by a second prefixed angle with respect to the axis of rotation of said rotor, a third prefixed number of mirrors inclined by a third prefixed angle with respect to the axis of rotation of said rotor and a fourth prefixed number of mirrors inclined by a fourth prefixed angle with respect to the axis of rotation of said rotor.

Advantageously said angles $\delta_1$ and $\delta_2$ of said mirrors are supplementary.

Preferably, said angle $\delta_1$ ranges from +5° to +15° and even more preferably from +7° to +9°. The values of $\delta_2$ are supplementary to those of $\delta_1$.

According to a preferred embodiment, said polygonal rotor has ten mirror faces with a sequence of the mirrors of: 3-1-2-1-2-1.

It is a third object of the invention to provide a method of scanning an optical code placed on a front wall of an article in movement toward a scanning reader and having a random position on said front wall, comprising forming of at least one light beam lying on a plane inclined by a prefixed angle with respect to said front wall and capable of reading said optical code within a prefixed distance range along the direction of forward movement of said article, characterized in that said method further comprises forming at least one first and one second light beam lying in planes inclined by a first and by a second prefixed angle with respect to said front wall, causing said first light beam to explore a first area of said front wall by means of at least one first scanning line, and causing said second light beam to explore a second area of said front wall by means of at least one second scanning line so that said first light beam reads said optical code within a first prefixed distance range along the direction of forward movement of said article and said second light beam reads said optical code within a second prefixed distance range along the direction of forward movement of said article, the overall distance range within which said first and second light beams read said optical code being greater than the useful range of reading distance that can be reached with just one light beam.

The invention has the advantage of increasing the depth of the field for reading the optical code, that is to say the distance between maximum and minimum height of the label with respect to the wall of the article, and it allows accurate readings of the optical to be taken whatever its position may be on the wall suitably selecting the angles of inclination of the planes containing the beams of light.

BRIEF DESCRIPTION OF THE DRAWINGS

Features and advantages of the invention will now be illustrated with reference to an embodiment represented as a non-limiting example in the enclosed figures, wherein.

DETAILED DISCUSSION OF PREFERRED EMBODIMENTS

Figure 1:
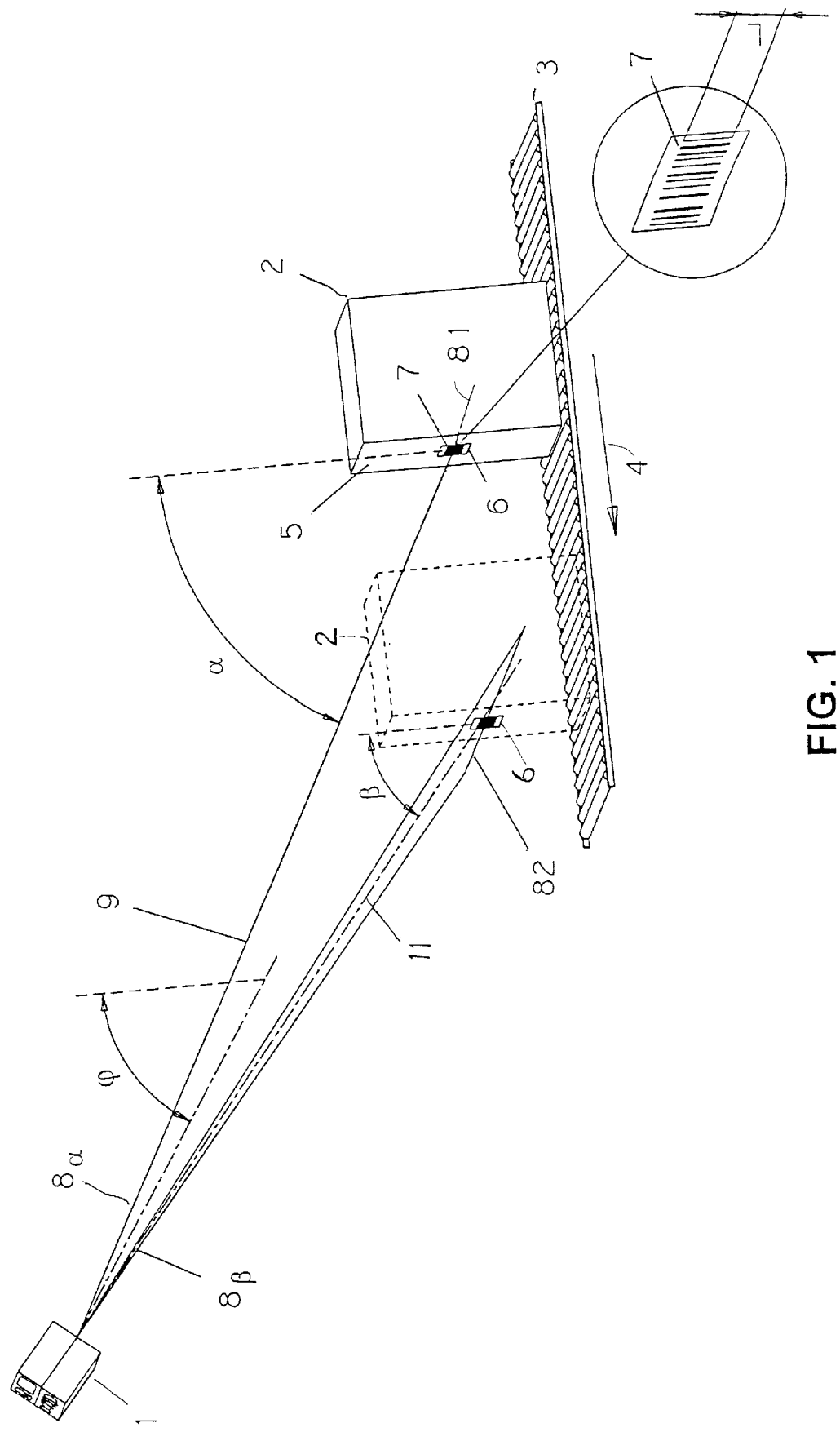
FIG. 1 is a schematic, perspective view of a scanning reader made according to the invention and of a conveyor belt with an article placed on it.

In FIG. 1 there is represented schematically a scanning reader 1 and an article 2 placed on a conveyor belt 3 that makes it move forward in the direction of the reader 1 (arrow 4). On a vertical front wall 5 of the article 2 there is a label 6 on which an optical bar code 7 is printed. The reader 1 emits a light beam $8_\alpha$ having an axis 9 that lies on a plane inclined by an angle $\alpha$ with respect to the wall 5. The beam $8_\alpha$, with inclination $\alpha$, executes a scanning line 81 substantially horizontal and orthogonal to the bar code 7, that allows an upper area of the wall 5 to be explored. Then, the light beam $8_\alpha$ is deflected sharply downward and forms a light beam $8_\beta$ that has axis 11 lying on a plane inclined by an angle $\beta$ with respect to the wall 5. The beam 8 with inclination $\beta$ executes a scanning line 82 on the wall 5 also having a substantially horizontal direction that allows a lower area of the wall 5 to be explored.

Suitable deflection and scanning means of the reader 1, that will be described later, project the light beam $8_\alpha$ with a scanning frequency $v_\alpha$ that is inversely proportional to the angle of inclination $\alpha$. The abovementioned deflection and scanning means project the same light beam $8_\beta$ with a scanning frequency $v_{62}$ that is inversely proportional to the angle of inclination $\beta$.

Figure 2:
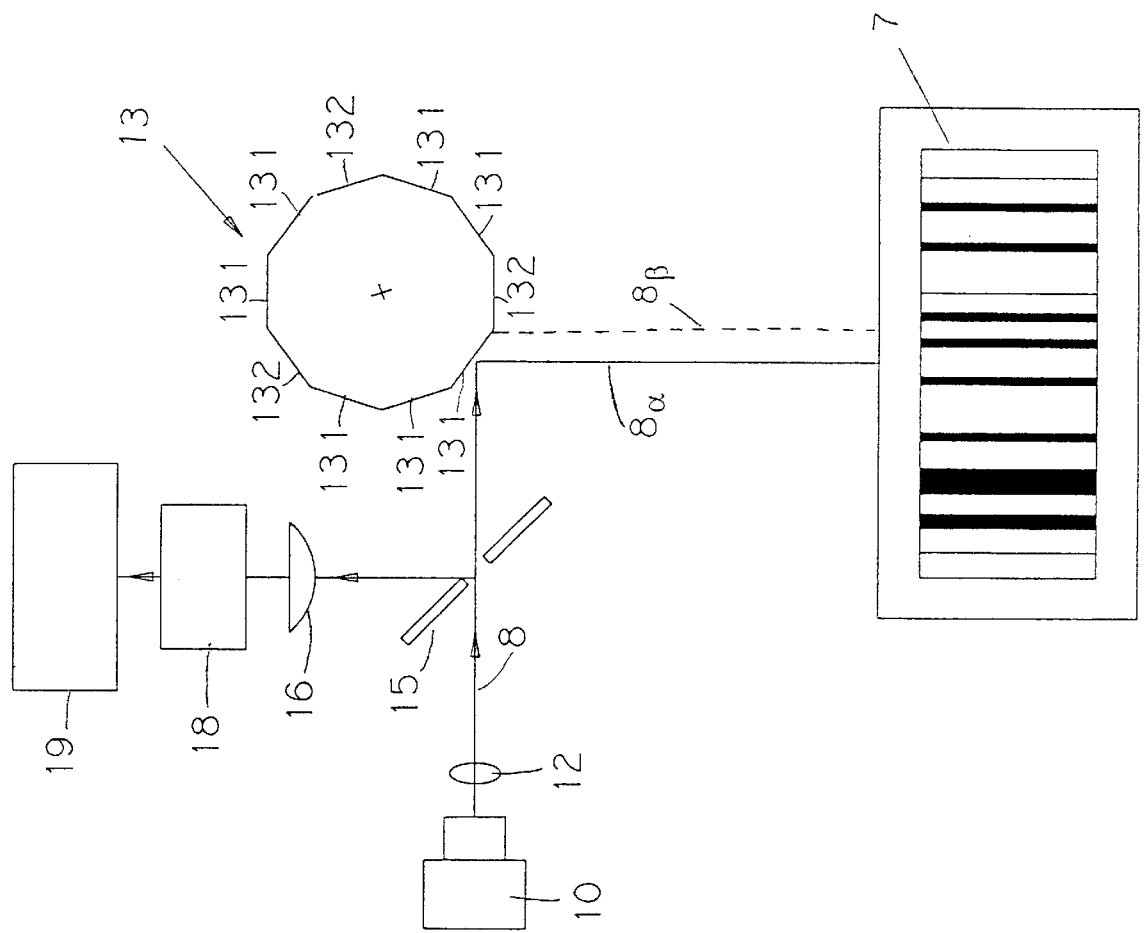
FIG. 2 is a schematic representation of the scanning reader of FIG. 1.

In FIG. 2 there is shown a reader 1 comprising a laser source 10 of a light beam 8 and optical components 12 capable of focusing the beam 8 at a prefixed distance with a preselected depth of field.

The light beam 8 is emitted by the source 10 with a preselected initial inclination $\phi$ with respect to the vertical wall 5 and it is directed on a polygonal rotor with mirrors 13, rotating at preselected speed, capable of deflecting the beam 8 according to two angles $\alpha$ and $\beta$ and giving rise first to the beam $8_\alpha$ and then to the beam $8_\beta$, forming the scanning lines 81 and 82.

Figure 3:
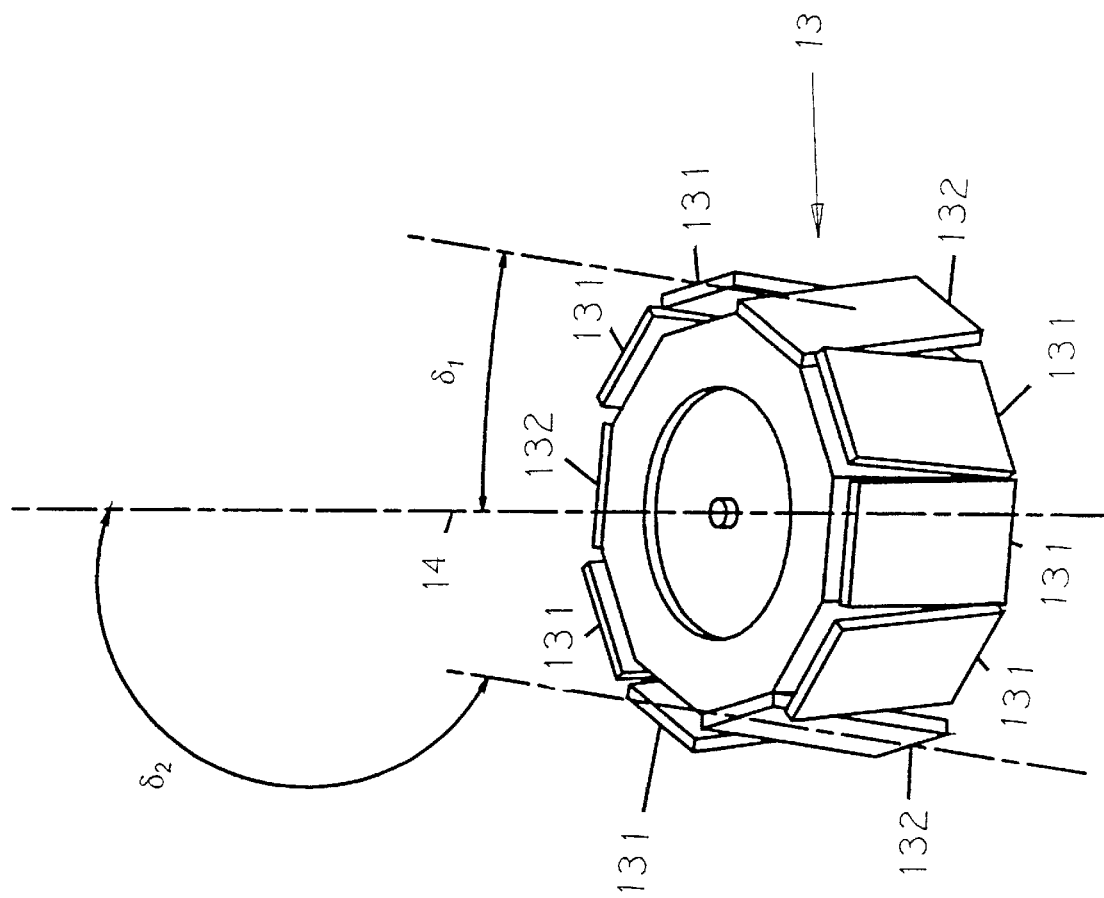
FIG. 3 is a perspective view of a polygonal rotor with mirrors of the scanning reader of FIG. 1.

The rotor 13, as shown in FIG. 3, is endowed with ten faces formed by mirrors having a preselected inclination with respect to the axis of rotation 14. In particular a group of mirror faces 131 is inclined with respect to the axis 14 by an angle $\delta_1 = \alpha - \beta/2$, while another group of mirror faces 132 is inclined with respect to the axis 14 by an angle $\delta_2 = 180° - \delta_1$. In the polygonal rotor 13 the ten mirror faces have successive inclinations $\delta_1$ and $\delta_2$ according to the sequence 3-1-2-1-2-1, that is to say three mirror faces 131 inclined by $\delta_1$, are followed by one mirror face 132 inclined by $\delta_2$; the latter is followed by two faces 131 inclined by $\delta_1$, then there is one mirror face 132 inclined by $\delta_2$, after this two faces 131 inclined by $\delta_1$ and lastly one mirror face 132 inclined by $\delta_2$.

Advantageously, the angle $\delta_1$ ranges from +5° to +15° and, preferably, from +7° to +9°. The values of $\delta_2$ are supplementary to those of $\delta_1$.

The beam 8 is deflected by the rotor 13 toward the wall 5 of the article 2 and, due to the effect of the rotation of the rotor 13 and of the different inclinations of its faces 131 and 132, it assumes the two inclinations $\alpha$ and $\beta$ where it forms the two scanning lines 81 and 82.

The light incident on the bar code 7 is diffused back toward the rotor 13 that deflects it toward a beam splitter 15. From the beam splitter 15 the light is directed toward an optical system 16 that focuses it on a photodetector 18. The photodetector 18 emits an electrical signal representative of the optical signal that is sent to a microprocessor unit of digitalization and then of decoding 19. From the decoding unit 19 a signal is emitted corresponding to the image of the bar code scanned by the beam $8_\alpha$ or by the beam $8_\beta$.

In case it is required to have a larger number of angles of inclination of the beam 8, say three or four, a rotor with mirrors 13 is used having a preselected number of faces inclined by a third angle $\delta_3$ and possibly by a fourth angle $\delta_4$ with respect to the axis of rotation 14, suitably selecting the sequence of the mirrors.

According to a variant of the invention, instead of the polygonal rotor with mirrors a mirror oscillating in jerks is used that moves between two or more positions that allow the desired angles of deflection of the light beam generated by the laser source to be obtained.

According to another variant of the invention, the same laser source is driven to oscillate in jerks between two or more positions that allow the desired angles of deflection of the light beam to be obtained.

With the scanning reader of the invention several advantages are obtained. The distance range along the direction of forward movement of the article 2 wherein it is possible to read the optical code 7 is increased considerably and a number of useful scans on the optical code 7 is obtained that is substantially constant for the two scanning lines 81 and 82 associated with the inclination angles $\alpha$ and $\beta$.

In particular, the reader 1 takes a reading of the optical code 7 in a distance range, along the direction of forward movement of the article 2, that is greater than the distance range that can be obtained with the beam 8 inclined by the angle $\alpha$ only or by the angle $\beta$ only or by an angle intermediate between $\alpha$ and $\beta$.

Figure 4:
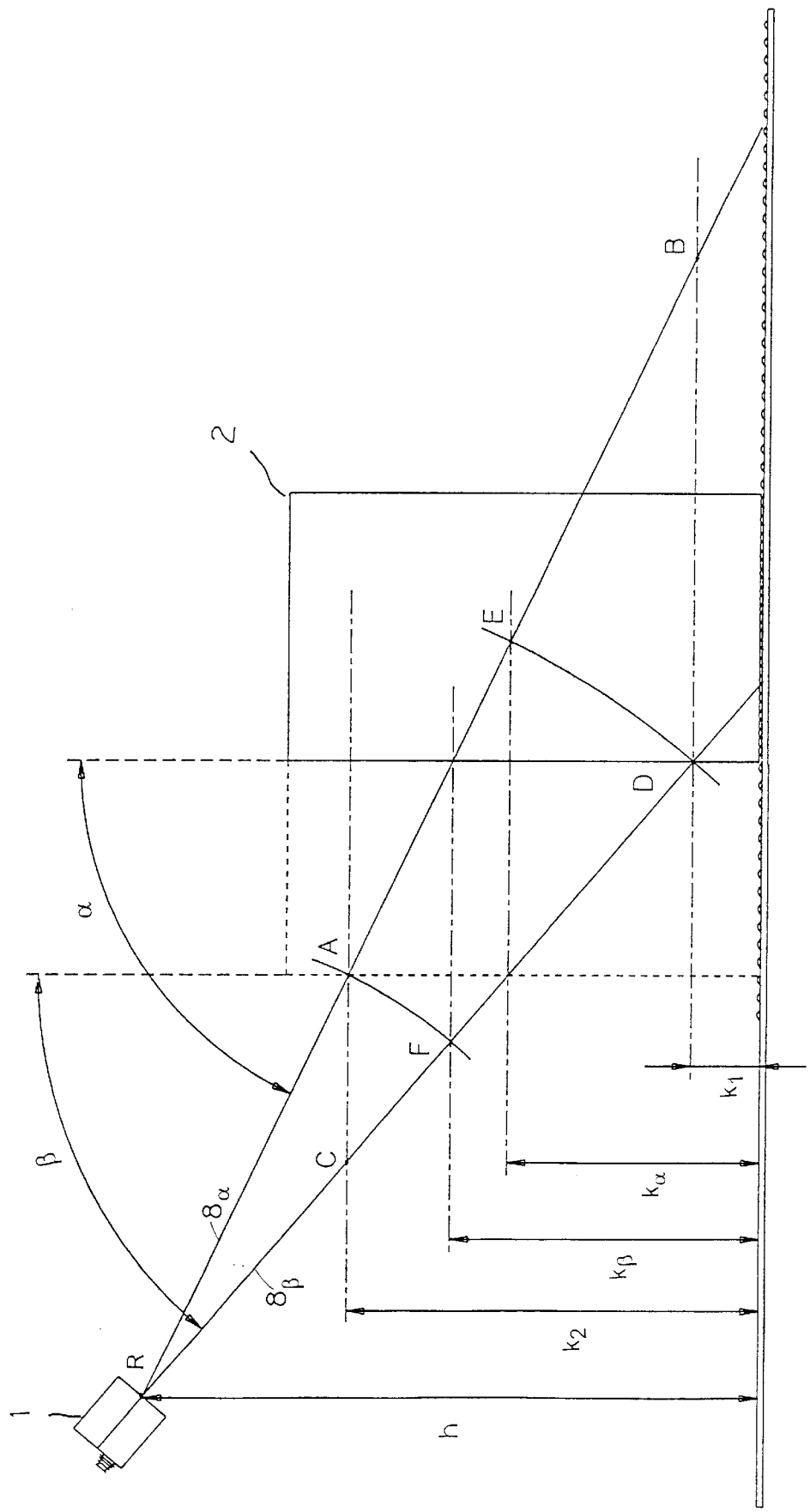
FIG. 4 is a schematic representation of the scanning reader, of the conveyor belt and of the article placed on it shown in FIG. 1, that highlights the magnitudes in play and the ratios between them.

In fact, as shown in FIG. 4, and defining;

h=height of the reader 1, k1=minimum height of the label 6 on the wall 5, k2=maximum height of the label 6 on the wall 5, with the beam $8_\alpha$ lying in a plane inclined by the angle $\alpha$ the reader 1 should have a depth of field $$D_\alpha = \overline{B-A} = (h-k1)/\cos\alpha - (h-k2)/\cos\alpha$$

while with the beam $8_\beta$ lying in a plane inclined by the angle $\beta$ the reader 1 should have a depth of field $$D_\beta = \overline{D-C} = (h-k1)/\cos\beta - (h-k2)/\cos\beta.$$

Since in order to read the code it is sufficient for only one of the beams $8_\alpha$ and $8_\beta$ to strike the code at a distance within the depth of field of the reader 1, the minimum depth of field required for said reader is equal to $$D_m = (h-k1)/\cos\beta - (h-k2)/\cos\alpha.$$

In the preceding expression there must, however, be a portion of superimposition, that is an area wherein the code is scanned by both beams $8_\alpha$ and $8_\beta$. Indicating with $k_\beta$ the maximum height at which it is possible to read the label with the beam $8_\beta$ and $k_\alpha$ the minimum height at which it is possible to read the label with the beam $8_\alpha$, the portion of superimposition ranges from $k_\alpha$ and $k_\beta$, that is $$k_\alpha \leq k_\beta.$$

Since $\overline{E-R} = \overline{D-R}$ and $\overline{F-R} = \overline{A-R}$ the preceding expression becomes $$(1-\cos\alpha/\cos\beta) \times h + k1 \times \cos\alpha/\cos\beta \leq (1-\cos\beta/\cos\alpha) \times h + k2 \times \cos\beta/\cos\alpha.$$

If this expression is not satisfied the beam has to have three or more angles of inclination.

The reader 1 is capable of executing a number of useful scans on the code with the beam $8_\alpha$, inclined by the angle $\alpha$, that is substantially equal to the number of useful scans on the code with the beam $8_\beta$, inclined by the angle $\beta$.

In fact, the number of useful scans on the code of the beam $8_\alpha$, with inclination $\alpha$ is $$n_\alpha = v_\alpha L \, tg\alpha / s,$$

and the number of useful scans on the code of the beam $8_\beta$ with inclination $\beta$ is $$n_\beta = v_\beta L \, tg\beta / s,$$

where $v_\alpha$, and $v_\beta$ are the number of scans per second that the reader 1 reserves for the beam with inclination $\alpha$ and with inclination $\beta$, respectively, L is the height of the bar code 7 and s is the speed of forward movement of the article 2.

In order to obtain $n_\alpha \cong n_\beta$ it must be that $$v_\alpha tg\alpha \cong v_\beta tg\beta,$$

that is to say the beam $8_\alpha$ with inclination $\alpha$ must execute a number of scans per second inversely proportional to the tangent of the angle $\alpha$ and beam $8_\beta$ with inclination $\beta$ must execute a number of scans per second inversely proportional to the tangent of the angle $\beta$.

In particular, positioning the reader 1 so as to form angles $\alpha$ and $\beta$ equal to 45° and 65°, the ratio between the optimum number of scans per second $v_\alpha / v_\beta = 7/3$.

The scanning reader made according to the invention has been tested under three different operating conditions and the results of them tests are given below.

The results of test 1 are given in Table 1.

TABLE 1

| | | |
|---|---|---|
| Bar code resolution (mm) | 0.3 | |
| Height of reader (h) (mm) | 530 | |
| Minimum height of label (k1) (mm) | 0 | |
| Maximum height of label (k"9 (mm) | 300 | |
| Minimum reading distance (A–R) (mm) | 400 | |
| Maximum reading distance (E–R) (mm) | 700 | |
| Angles of the light beam | $\beta = 40°$ | $\alpha = 60°$ |
| Reading height corresponding to the minimum reading distance (mm) | 211 | 318 |
| Reading height corresponding to the maximum reading distance (mm) | –18 | 168 |
| Depth of field of the single beam (mm) | 229 | 150 |
| Actual resulting depth of field (mm) | 336 | |

What is meant by reading height corresponding to the minimum distance is the difference between the height of the reader and the projection of the minimum reading distance on the wall 5, that in FIG. 4 corresponds to $k_\beta$ ($\beta$) or k2 ($\alpha$). What is meant by reading height corresponding to the maximum distance is the difference between the height of the reader and the projection of the maximum reading distance on the wall 5, that in FIG. 4 corresponds to k1 ($\beta$) or $k_\alpha$ ($\alpha$).

The negative value (–18) derives from the fact that the origin of the ordinates coincides with the upper end of the segment that represents the minimum height K1. In the particular case illustrated in FIG. 4 the origin of the ordinates thus coincides with the point D.

Using a polygonal rotor with mirrors like that of FIG. 3, having $\delta_1 = \alpha - \beta/2 = 10°$ and $\delta_2 = 170°$, the reader with the characteristics indicated in Table 1 can achieve a reading field on the wall of the article that contains the code having a height (actual depth of field) equal to 336 mm, while the beam inclined by 40° alone would have a depth of field of 229 mm and the beam inclined by 60° alone would have a depth of field of 150 mm.

The results of test 2 are given in Table 2.

TABLE 2

| Bar code resolution (mm) | 0.15 | | | |
|---|---|---|---|---|
| Height of reader (h) (mm) | 383 | | | |
| Minimum height of label (k1) (mm) | 0 | | | |
| Maximum height of label (k2) (mm) | 180 | | | |
| Minimum reading distance (mm) | 400 | | | |
| Maximum reading distance (mm) | 500 | | | |
| Angles of the light beam | $\theta = 40°$ | $\gamma = 50°$ | $\beta = 56°$ | $\alpha = 60°$ |
| Reading height corresponding to the minimum reading distance (mm) | 76 | 126 | 159 | 183 |
| Reading height corresponding to the maximum reading distance (mm) | 0 | 61 | 103 | 133 |
| Depth of field of the single beam (mm) | 76 | 65 | 56 | 50 |
| Actual resulting depth of field (mm) | | | 183 | |

Using a polygonal rotor with mirrors with $\delta_1=10°$, $\delta_2=0°$, $\delta_3=174°$, $\delta_4=170°$, with the reader having the characteristics indicated in Table 2, a reading field is achieved on the wall of the article that contains the code, having a height (actual depth of field) equal to 183 mm.

Lastly a comparison test has been executed between a traditional scanning reader, endowed with a light beam having a single inclination, and a scanning reader made according to the invention, endowed with a light beam capable of assuming two different inclinations. The results of the third test are given in Table 3.

TABLE 3

| | traditional reader | reader of the invention | |
|---|---|---|---|
| Minimum reading distance (mm) | 400 | 400 | |
| Maximum reading distance (mm) | 700 | 700 | |
| Initial depth of field (mm) | 300 | 300 | |
| Minimum height of label (mm) | 0 | 0 | |
| Maximum height of label (mm) | 360 | 360 | |
| Height of reader (mm) | 574 | 495 | |
| Angles of the light beam | 35° | 45° | 65° |
| Reading height corresponding to the maximum reading distance (mm) | 0 | 0 | 199 |
| Reading height corresponding to the minimum reading distance (mm) | 246 | 212 | 326 |
| Maximum depth of field (mm) | 246 | 326 | |
| Height of label (mm) | 17 | 17 | |
| Apparent height of label (mm) | 11.9 | 17.00 | 36.46 |
| Speed of article (m/sec) | 2 | 2 | 2 |
| Apparent speed (m/sec) | 2.86 | 2.00 | 0.93 |
| Number of scans/sec | 800 | 560 | 240 |
| Number of useful scans on code | 4.76 | 4.76 | 4.37 |
| Time of dwell on code (ms) | 5.95 | 8.50 | 18.23 |

The apparent speed is represented by the speed of the article/tangent of the angle of the beam.

The apparent height of the label is represented by the height of the label x the tangent of the angle of the beam.

The figures given in Table 3 highlight that a light beam having two inclinations ($\alpha=65°$; $\beta=45°$) allows an actual depth of field to be obtained equal to 326 mm against an actual depth of field of 246 mm that can be obtained with a light beam having a single inclination (angle of 35°).

Moreover, the beam having two inclinations provides a number of useful scans on the code equal to 4.76 for the 45° angle and 4.37 for the 65° angle, while the beam having a single inclination of 35° it provides a number of useful scans on the code equal to 4.76. And this occurs in spite of the traditional reader providing 800 scans/sec on the single beam, while the reader of the invention, using a rotor 13 with mirrors having seven mirrors to generate the beam $\beta$ and three mirrors for the beam $\alpha$, provides 560 scans/sec for the beam $\beta$ and 240 scans/sec for the beam $\alpha$, respectively, for a total of 800 scans/sec.

What is claimed is:

1. A scanning reader of an optical code placed on a front wall of an article in movement toward said reader and said optical code having a random position on said front wall, said reader comprising:

generation means capable of forming at least one laser light beam lying on a plane inclined by a prefixed angle ($\phi$) with respect to said front wall and capable of reading said optical code within a prefixed distance range along the direction of forward movement of said article, wherein said generation means form at least one first laser light beam lying in a plane inclined by a first prefixed angle ($\alpha$) and at least one second laser light beam lying in a plane inclined by a second prefixed angle ($\beta$) with respect to said front wall, said first laser light beam exploring a first area of said front wall by means of at least one first scanning line and said second laser light beam exploring a second area of said front wall by means of at least one second scanning line so that said first laser light beam is capable of reading said optical code within a first prefixed distance range along the direction of forward movement of said article and said second laser light beam is capable of reading said optical code within a second prefixed distance range along the direction of forward movement of said article, the overall distance range within which said first and second laser light beams are capable of reading said optical code being greater than the useful distance range that can be reached by one laser light beam only.

2. A reader according to claim 1, characterized in that each of said angles of inclination ($\alpha$, $\beta$) ranges from 10° to 80°.

3. A reader according to claim 2, characterized in that each of said angles of inclination ($\alpha$, $\beta$) ranges from 30° to 70°.

4. A reader according to claim 3, characterized in that each of said angles of inclination ($\alpha$, $\beta$) ranges from 40° to 60°.

5. A reader according to claim 1, characterized in that to said first angle of inclination ($\alpha$) there corresponds an upper scanning line and to said second angle of inclination ($\beta$) there corresponds a lower scanning line, said first angle ($\alpha$) being greater than said second angle ($\beta$).

6. A reader according to claim 5, characterized in that said first angle of inclination ($\alpha$) ranges from 50° to 70° and said second angle of inclination ($\beta$) ranges from 30° to 50°.

7. A reader according to claim 6, characterized in that said first angle of inclination ($\alpha$) is equal to 60° and said second angle of inclination ($\beta$) is equal to 40°.

8. A reader according to claim 1, characterized in that said generation means form at least one third light beam inclined by a third prefixed angle with respect to said front wall, said third light beam exploring a third area of said front wall by means of a third scanning line, said third prefixed angle having a value intermediate between said first and second angle.

9. A reader according to claim 1, characterized in that said generation means form at least one third and one fourth light beam inclined by a third and a fourth prefixed angle with respect to said front wall, said third and fourth light beam exploring a third and a fourth area of said front wall by means of a third and fourth scanning line, said third and fourth prefixed angle having values intermediate between said first and second angle.

10. A reader according to claim 1, characterized in that said generation means form said first beam, that generates said first scanning line, with a first prefixed number of scans per unit of time ($v_\alpha$) and said second beam, that generates said second scanning line, with a second prefixed number of scans per unit of time ($v_\beta$), the sum of said first and second number of scans per unit of time ($v_\alpha$, $v_\beta$) being equal to the total value of scans per unit of time emitted by said generation means.

11. A reader according to claim 10, characterized in that said first and second number of scans per unit of time ($v_\alpha$, $v_\beta$) are selected so that the number of useful scans ($n_\alpha$, $n_\beta$) on said optical code for each of said scanning lines is substantially constant.

12. A reader according to claim 1, characterized in that said generation means form said first beam, that generates said first scanning line, with a first prefixed number of scans per unit of time, said second beam, that generates said second scanning line, with a second prefixed number of scans per unit of time and said third beam, that generates said third scanning line, with a third prefixed number of scans per unit of time, the sum of said first, second and third number of scans per unit of time being equal to the total value of scans per unit of time emitted by said generation means.

13. A reader according to claim 12, characterized in that said first, second and third number of scans per unit of time are selected so that the number of useful scans on said optical code for each of said scanning lines is substantially constant.

14. A reader according to claim 1, characterized in that said generation means form said first beam, that generates said first scanning line, with a first prefixed number of scans per unit of time, said second beam, that generates said second scanning line, with a second prefixed number of scans per unit of time, said third beam, that generates said third scanning line, with a third prefixed number of scans per unit of time and said fourth beam, that generates said fourth scanning line, with a fourth prefixed number of scans per unit of time, the sum of said first, second, third and fourth number of scans per unit of time being equal to the total value of scans per unit of time emitted by said generation means.

15. A reader according to claim 14, characterized in that said first, second, third and fourth number of scans per unit of time are selected so that the number of useful scans on said optical code for each of said scanning lines is substantially constant.

16. A reader according to claim 1, wherein said generation means comprise at least one source of a light beam and deflection means of said beam optically associated with said source of light, characterized in that said deflection means comprise an oscillating mirror whose inclination is periodically changed.

17. A reader according to claim 1, wherein said generation means comprise at least one laser source of a light beam, characterized in that said laser source is driven to oscillate in jerks between two or more positions.

18. A reader according to claim 1, wherein said generation means comprise at least one source of a light beam and deflection means of said beam optically associated with said source, characterized in that said deflection means comprise a polygonal rotor rotating at prefixed speed on the faces of which there are mirrors.

19. A reader according to claim 18, characterized in that said polygonal rotor comprises a first prefixed number of mirrors inclined by a first prefixed angle $\delta_1$ with respect to the axis of rotation of said rotor and a second prefixed number of mirrors inclined by a second prefixed angle $\delta_2$ with respect to the axis of rotation of said rotor, said first prefixed number of mirrors forming said first light beam, said second prefixed number of mirrors forming said second light beam.

20. A reader according to claim 19, characterized in that said angles $\delta_1$, $\delta_2$ of said mirrors of said rotor are supplementary.

21. A reader according to claim 20, characterized in that said angle $\delta_1$ ranges from +5° to +15°.

22. A reader according to claim 21, characterized in that said angle $\delta_1$ ranges from +7° to +9°.

23. A reader according to claim 19, characterized in that said polygonal rotor has ten faces and a sequence of the mirrors of 3 at angle $\delta_1$, 1 at angle $\delta_2$, 2 at angle $\delta_1$, 1 at angle $\delta_2$, 2 at angle $\delta_1$, and 1 at angle $\delta_2$.

24. A reader according to claim 18, characterized in that said polygonal rotor comprises a first prefixed number of mirrors inclined by a first prefixed angle with respect to the axis of rotation of said rotor, a second prefixed number of mirrors inclined by a second prefixed angle with respect to the axis of rotation of said rotor and a third prefixed number of mirrors inclined by a third prefixed angle with respect to the axis of rotation of said rotor, said first prefixed number of mirrors forming said first light beam, said second prefixed number of mirrors forming said second light beam and said third prefixed number of mirrors forming a third light beam.

25. A reader according to claim 18, characterized in that said polygonal rotor comprises a first prefixed number of mirrors inclined by a first prefixed angle with respect to the axis of rotation of said rotor, a second prefixed number of mirrors inclined by a second prefixed angle with respect to the axis of rotation of said rotor, a third prefixed number of mirrors inclined by a third prefixed angle with respect to the axis of rotation of said rotor and a fourth prefixed number of mirrors inclined by a fourth prefixed angle with respect to the axis of rotation of said rotor, said first prefixed number of mirrors forming said first light beam, said second prefixed number of mirrors forming said second light beam, said third prefixed number of mirrors forming a third light beam and said fourth prefixed number of mirrors forming a fourth light beam.

26. A scanning reader of an optical code placed on a front wall of an article in movement toward said reader and having a random position on said front wall, said reader comprising:

generation means capable of forming at least one light beam lying on a plane inclined by a prefixed angle ($\phi$) with respect to said front wall and capable of reading said optical code within a prefixed distance range along the direction of forward movement of said article, wherein said generation means form at least one first and one second light beam lying in planes inclined by a first and by a second prefixed angle ($\alpha$, $\beta$) with respect to said front wall, said first light beam exploring a first area of said front wall by means of at least one first scanning line and said second light beam exploring a second area of said front wall by means of at least one second scanning line so that said first light beam is capable of reading said optical code within a first prefixed distance range along the direction of forward movement of said article and said second light beam is capable of reading said optical code within a second prefixed distance range along the direction of forward movement of said article, the overall distance range within which said first and second light beams are capable of reading said optical code being greater than the useful distance range that can be reached by one light beam only, wherein said generation means form said first beam, that generates said first scanning line, with a first prefixed number of scans per unit of time ($v_\alpha$) and said second beam, that generates said second scanning line, with a second prefixed number of scans per unit of time ($v_\beta$), the sum of said first and second number of scans per unit of time ($v_\alpha$, $v_\beta$) being equal to the total value of scans per unit of time emitted by said generation means, wherein the ratio between the number of scans per unit of time of each light beam ($v_\alpha$, $v_\beta$) is inversely proportional to the tangent of the angle of the same beam (tg$\alpha$, tg$\beta$) with respect to the front wall.

27. A scanning reader of an optical code placed on a front wall of an article in movement toward said reader and having a random position on said front wall, said reader comprising:

generation means capable of forming at least one light beam lying on a plane inclined by a prefixed angle ($\phi$) with respect to said front wall and capable of reading said optical code within a prefixed distance range along the direction of forward movement of said article, wherein said generation means form at least one first and one second light beam lying in planes inclined by a first and by a second prefixed angle ($\alpha$, $\beta$) with respect to said front wall, said first light beam exploring a first area of said front wall by means of at least one first scanning line and said second light beam exploring a second area of said front wall by means of at least one second scanning line so that said first light beam is capable of reading said optical code within a first prefixed distance range along the direction of forward movement of said article and said second light beam is capable of reading said optical code within a second prefixed distance range along the direction of forward movement of said article, the overall distance range within which said first and second light beams are capable of reading said optical code being greater than the useful distance range that can be reached by one light beam only, wherein said generation means form said first beam, that generates said first scanning line, with a first prefixed number of scans per unit of time ($v_\alpha$) and said second beam, that generates said second scanning line, with a second prefixed number of scans per unit of time ($v_\beta$) the sum of said first and second number of scans per unit of time ($v_\alpha$, $v_\beta$) being equal to the total value of scans per unit of time emitted by said generation means, wherein said first and second number of scans per unit of time ($v_\alpha$, $v_\beta$) are selected so that the number of useful scans ($n_\alpha$, $n_\beta$) on said optical code for each of said scanning lines is substantially constant, wherein the ratio between the first and the second number of scans per unit of time ($v_\alpha$, $v_\beta$) is equal to 7/3.

28. A method of scanning an optical code placed on a front wall of an article in movement toward a scanning reader and said optical code having a random position on said front wall, comprising the steps of:

forming of at least one laser light beam lying on a plane inclined by a prefixed angle ($\phi$) with respect to said front wall and capable of reading said optical code within a prefixed distance range along the direction of forward movement of said article, forming at least one first laser light beam lying in a plane inclined by a first prefixed angle ($\alpha$)and at least one second laser light beam lying in a plane inclined by a second prefixed angle ($\beta$) with respect to said front wall, causing said first laser light beam to explore a first area of said front wall by means of at least one first scanning line, and causing said second laser light beam to explore a second area of said front wall by means of at least one second scanning line so that said first laser light beam reads said optical code with a first prefixed distance range along the direction of forward movement of said article and said second laser light beam reads said optical code within a second prefixed distance range along the direction of forward movement of said article, the overall distance range within which said first and second laser light beams read said optical code being greater than the useful distance range that can be reached by one laser light beam only.

29. A scanning reader of an optical code placed on a front wall of an article in movement toward said reader and said optical code having a random position on said front wall, said reader comprising:

a laser generator of at least one laser light beam lying on a plane inclined by a prefixed angle ($\phi$) with respect to said front wall and capable of reading said optical code within a prefixed distance range along the direction of forward movement of said article, wherein said generator includes a mirror scanning system to provide at least one first laser light beam lying in a plane inclined by a first prefixed angle ($\alpha$) and at least one second laser light beam lying in a plane inclined by a second prefixed angle ($\beta$) with respect to said front wall, said first laser light beam exploring a first area of said front wall by means of at least one first scanning line and said second laser light beam exploring a second area of said front wall by means of at least one second scanning line so that said first laser light beam is capable of reading said optical code within a first prefixed distance range along the direction of forward movement of said article and said second laser light beam is capable of reading said optical code within a second prefixed distance range along the direction of forward movement of said article, the overall distance range within which said first and second laser light beams are capable of reading said optical code being greater than the useful distance range that can be reached by one laser light beam only.

* * * * *